United States Patent [19]

Stade et al.

[11] 3,788,677
[45] Jan. 29, 1974

[54] EMISSION-FREE EXHAUST PIPE JOINT AND CLAMP THEREFOR

[76] Inventors: Bertil Stade, 480 Knollwood Drive, Wood Dale, Ill. 60191; Edward Hoglund, 1020 Lois Avenue, Park Ridge, Ill. 60068

[22] Filed: Mar. 20, 1972

[21] Appl. No.: 236,364

Related U.S. Application Data

[63] Continuation-in-part of Ser. No. 142,977, May 13, 1971, abandoned.

[52] U.S. Cl.................. 285/367, 285/410, 285/423
[51] Int. Cl............................................ F16l 17/00
[58] Field of Search ... 285/233, 365, 366, 367, 407, 285/408, 409, 410, 424, 419, 373, 420, 283, 423; 24/284, 285, 125 K, 135 K, 249 LS

[56] References Cited
UNITED STATES PATENTS

| | | | |
|---|---|---|---|
| 3,455,582 | 7/1969 | Von Hoevel | 285/367 X |
| 2,271,425 | 1/1942 | Harris | 285/367 |
| 2,721,582 | 10/1955 | Hoke | 285/419 X |
| 1,487,389 | 3/1924 | King | 285/424 X |
| 1,839,761 | 1/1932 | Hutton | 285/419 X |
| 2,937,893 | 5/1960 | Hill et al. | 285/410 X |

FOREIGN PATENTS OR APPLICATIONS

| | | | |
|---|---|---|---|
| 83,650 | 8/1964 | France | 285/410 |
| 4,583 | 1914 | Great Britain | 285/283 |
| 10,714 | 1904 | Great Britain | 285/420 |

Primary Examiner—Dave W. Arola
Attorney, Agent, or Firm—I. Irving Silverman et al.

[57] ABSTRACT

The joint of the invention comprises exhaust pipes formed with beaded ends providing abutting flange-like surfaces that are axially forced together by a clamp applying wedging forces on the external beads. Modified forms of the joint have pilot extensions on one pipe of the joined pair, the bead on this one pipe in each case being spaced from the free end of the pipe. The pilot extension is telescoped within the other pipe bringing the beads together side by side and the clamp is engaged over both beads. In some joints, such as those formed in pipes made of a tough metal, a gasket may be inserted between the beaded ends.

The clamp for the joints is one which has a concave groove engaging over the pair of beads to apply the axial force by the wedging action produced when the clamp is constricted. The preferred clamp is made in two halves which have a hinged connection of great simplicity comprising merely a rectangular bight formed on one end of one half and a tongue formed on one end of the second half. The tongue lies in the bight and cannot move laterally because of the self-centering action produced when the clamp is engaged on the beads. The other end of each half comprises a tongue with perforations aligned to receive a bolt and nut to enable the halves to be clamped together, pivoting with respect to one another on the hinged connection.

11 Claims, 8 Drawing Figures

PATENTED JAN 29 1974

INVENTORS
Bertil Stade
Edward Hoglund
BY Silverman & Cass ATTORNEYS

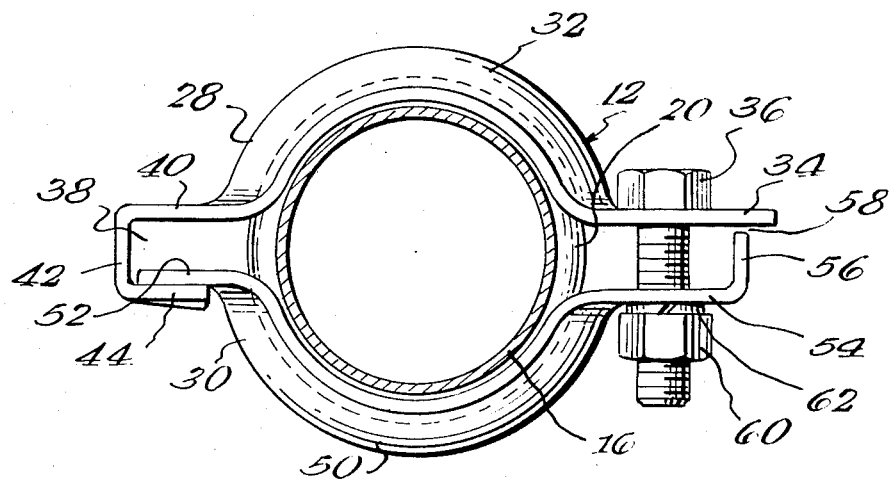
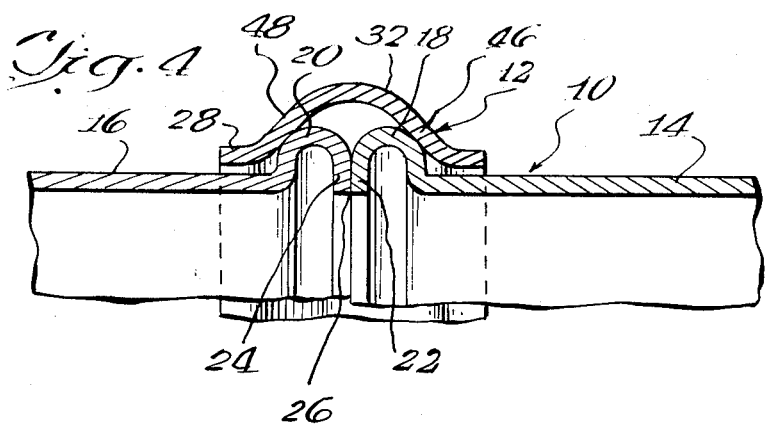
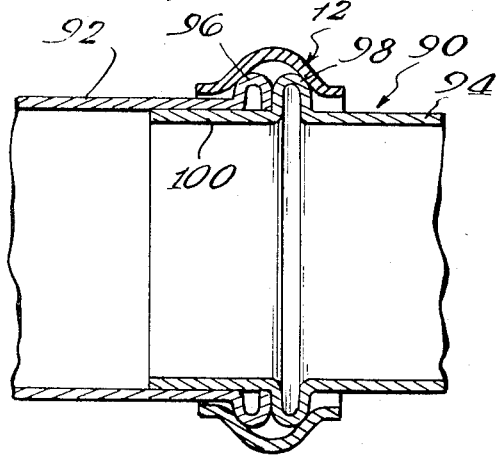
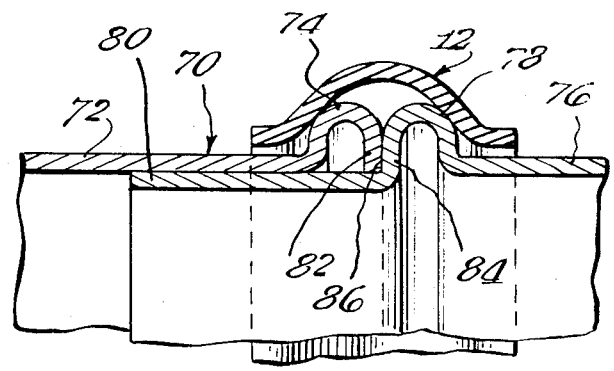

3,788,677

EMISSION-FREE EXHAUST PIPE JOINT AND CLAMP THEREFOR

CROSS-REFERENCE TO RELATED APPLICATION

This application is a continuation-in-part of our co-pending U.S. application Ser. No. 142,977 filed on May 13, 1971 and now abandoned.

BACKGROUND OF THE INVENTION

The invention herein relates to pipe joints and clamps therefor and more particularly is concerned with a pipe joint and clamp therefor which is intended to be emission-free.

The internal combustion engine has been singled out as one of the greatest sources of pollution today and on this account it has been examined carefully in every respect by governmental agencies for deficiencies aside from the exhaust fumes which it emits. Additionally, automobile and truck manufacturers have become more sensitive to the well-being of the passengers and drivers of the vehicles that are produced to an extent where such manufacturers themselves have scrutinized the construction and operation of their own engines for faults.

The invention herein is concerned with improvements in the exhaust systems of vehicles motivated by internal combustion engines. The normal location of an engine is in the front of the vehicle and this requires that the exhaust fumes from the engine be vented at the rear of the vehicle. Rear-engined and mid-engined vehicles have the same problems but to a lesser extent. The problem is to transport the exhaust fumes to the tailpipe without loss of emission between the engine exhaust manifold or manifolds and the tailpipe. The ordinary exhaust system has a muffler which is interposed between the tailpipe and the exhaust manifold. High powered vehicles have two exhaust systems from the respective groups of four cylinders of the common V-8 engine with a muffler and often a resonator in addition in each system.

It is obvious that an exhaust system which includes at least one muffler and pipes between the muffler and engine and between the muffler and the rear end of the vehicle can be made in a unitary assembly with the joints permanently welded together. Such an exhaust system will be emission-free between the engine and the tailpipe vent. This would clearly prevent leaking exhaust fumes from entering the passenger compartment. Such a system would be unsatisfactory from two standpoints. In the first place it would be difficult to repair and replace and in the second place it would be very expensive to replace. No exhaust system in commercially produced vehicles today is corrosion-proof. Accordingly it is expected that during the ordinary life of a vehicle the muffler and perhaps the other pipes will at some time have to be replaced.

The problems with known exhaust systems have not been satisfactorily solved, so far as is known. The joints in such systems are not emission-free and this may be due either to the construction of the joints or the construction of the pipe clamps used with such joints or both. Presently known joints comprise telescoped lengths of pipe held in such telescoped condition by means of constricting pipe clamps. Pipe clamps known apply considerable constricting force to squeeze the outer pipe against the inner pipe of the telescoped joint. These clamps literally neck the outer pipe against the inner pipe, but in doing so, the outer pipe generally corrugates and the exhaust fumes escape through the corrugations.

In any event, present joints are not reliably emission free.

The invention herein is directed to structure which solves the above problems. The invention comprises a joint and a pipe clamp for use with the joint and the combination of both.

In the construction of pipe clamps another problem arises. Modern high speed mass production has spawned a type of worker who must be provided with tools and assembly jobs which require no exercise of judgement. Parts must go together in a fool-proof manner and be constructed to forgive bad performance by the worker. To be specific, in the case of a pipe clamp, if there are two bolts which must be taken up in order to secure the pipe clamp to a joint, it cannot be expected of such workman that he will carefully apply torque to each bolt alternately back and forth in order to constrict the clamp evenly. Thus it is absolutely essential that the pipe clamp have only one bolt to be taken up and in so doing the workman must secure the clamp for its maximum utility and efficiency.

Prior clamps which have a single bolt take-up have not been able to apply even compression around their circumferences with resulting loss of efficiency.

The invention herein solves the problems which were inherent in prior pipe clamps that used a single bolt for take-up.

Three examples of prior art conduit joints and clamps are disclosed in the following United States Patents:

| Day | 711,946 | |
| Houghton, et al. | 2,548,216 | Class 285–129 |
| Whitcomb | 3,151,373 | Class 24–279 |

In many applications the joint and clamp of the invention have achieved an emission-free clamped joint without the use of gaskets. However in some applications where the pipes are made of a tough metal, e.g., stainless steel, which is hard to form such that the beaded ends are not substantially uniform in shape, a gasket may be employed in the joint of the present invention between the beaded ends of the pipes.

SUMMARY OF THE INVENTION

According to the invention, the joint for exhaust pipes is achieved by providing a rolled end on each pipe, the rolled ends being butted face to face and presenting a pair of circumferential ring-like beads side by side to the pipe clamp. The pipe clamp for such joint has a band or pair of bands with a configuration which is arcuate in cross section or V-shaped and is encircled around the joint with the beads engaged by the inside of the band or bands. Constricting the clamp by taking up on the bolt or bolts holding same together applies a wedging force of a substantial amount on the respective beads forcing them together axially and this provides an extremely tight joint. The joint is easily taken apart and the parts replaced. The clamp does no damage to the pipes.

A preferred form of joint has in addition an extension on one of the pipes which telescopes within the other pipe, the rolled bead on the pipe with the extension being spaced from its end.

The pipe clamp of the invention has a pair of bands which include a simple bight on the end of one band and a flat radial extension on one end of the other band. These two ends engage within one another and will not separate laterally because the cooperation between the arcuate groove of the bands and the beads keep the bands perfectly aligned with one another. The opposite ends of both bands have cooperating perforations for reception of a bolt and nut. Taking up on the bolt and nut will constrict the bands cooperatively upon the adjacent bead formations and wedgingly force them together axially to provide a tight connection.

If desired, a gasket may be interposed between the rolled bead ends of the pipes in the pipe joint.

BRIEF DESCRIPTION OF THE DRAWINGS

FIG. 3 is a sectional view taken generally along the line 3—3 of FIG. 2 and in the direction indicated;

FIG. 4 is a fragmentary sectional view taken generally along the line 4—4 of FIG. 2 and in the direction indicated;

FIG. 5 is a gragmentary sectional view through a modified form of joint according to the invention;

FIG. 6 is a median sectional view through another modified form of joint constructed in accordance with the invention;

DESCRIPTION OF THE PREFERRED EMBODIMENTS

Figure 1:
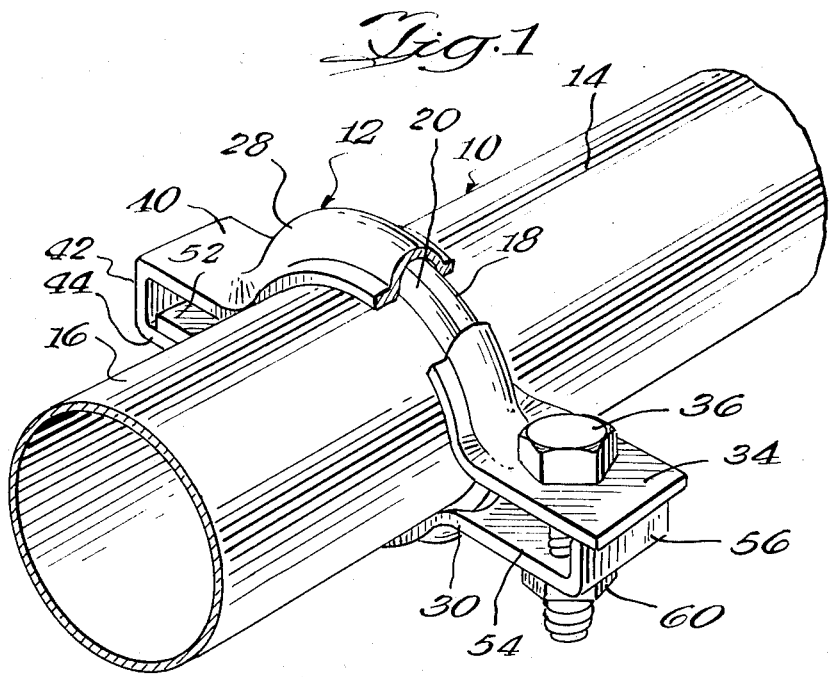
FIG. 1 is a perspective view with portions broken away showing the joint of the invention and a pipe clamp constructed in accordance with the invention.

The reference character 10 is used generally to designate a joint constructed in accordance with the invention and the reference character 12 is used generally to designate a clamp constructed in accordance with the invention. A joint as referred to herein will mean a pair of pipes which are associated together preparatory to securing the same in such association. It will exclude securing means. When securing means are included, the assembly will be referred to as a joint with pipe clamp.

Figure 2:
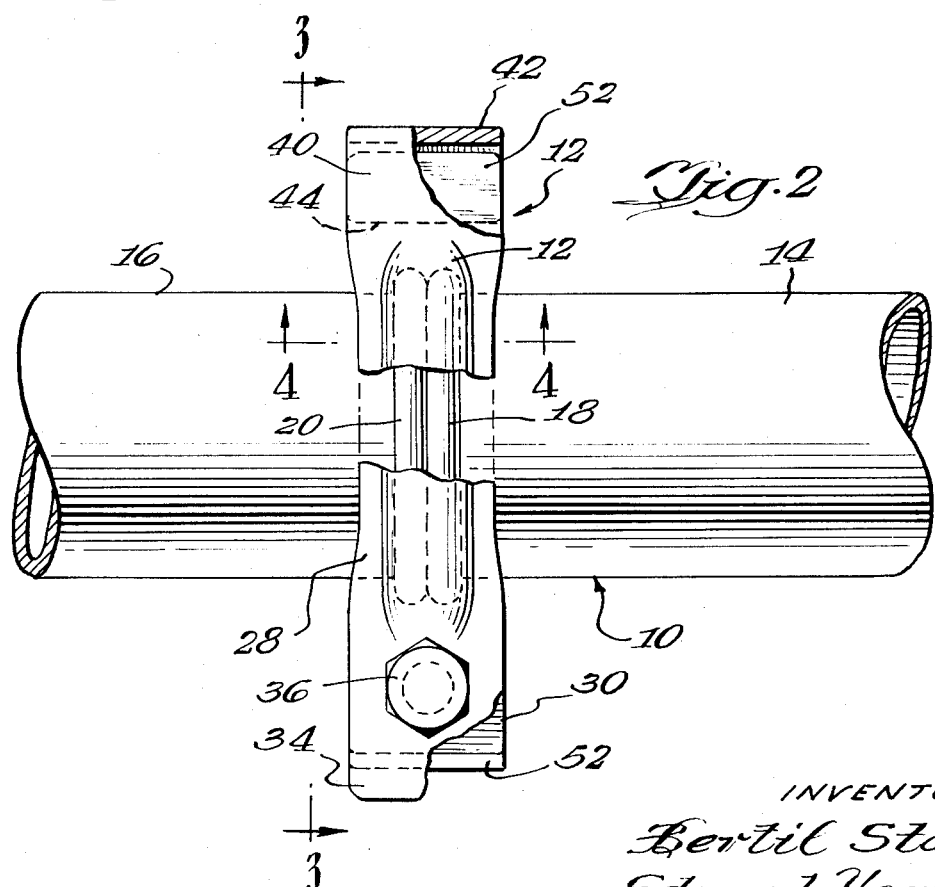
FIG. 2 is a top plan view of the same with portions broken away.

The pipe joint 10 is formed of a pair of pipes 14 and 16 which are formed with rolled ends, thereby producing the ring-like bead formations 18 and 20 on such ends. The axially facing surfaces comprise annular flanges 22 and 24 which butt to form the contact juncture 26. The ring-like bead formations 18 and 20 (hereinafter called "beads") are of substantially greater outer diameter than the pipes 14 and 16 which in this case are of the same outer diameter. When the joint is assembled the beads are arranged side by side as shown in FIGS. 1, 2 and 4.

The pipe clamp 12 is formed of two semi-circular bands 28 and 30 each having a medial portion and two ends. The band 28 has the medial portion 32, one end which has a generally radially outwardly extending tab or tongue 34 provided with a perforation for receiving the bolt 36, the other end having a generally rectangular bight 38 formed of a first planar portion 40, a right angle bent connecting bridge 42 and a second planar portion 44 parallel with and spaced from the planar portion 40. The medial portion 32 is formed in a semi-circle and has a somewhat arcuate cross section, the concave surface facing radially inward as best shown in FIG. 4. The sides of the arcuate cross section are designated 46 and 48 in this view and these sides present the equivalent of two wedging surfaces to the opposite beads 18 and 20 respectively along a substantial portion of the halves thereof facing the medial portion 32.

The band 30 has the medial portion 50 of identical construction as the medial portion 32 and one end which has a generally radially extending flat tongue 52 adapted to fit into the bight 38 and engage against the inner face of the planar portion 44, being shorter than said planar portion. The other end of the band 30 has a tab or tongue 54 which extends generally radially from the band and has a right angle bent flange 56 on its free end which is spaced from the tab or tongue 34 as shown at 58. The tab 54 has a perforation which aligns with the perforation in the tab 34 to receive the bolt 36. A nut 60 and washer 62 enable the bolt 36 to be taken up to bring the tabs 34 and 54 toward one another, the flange 56 preventing inordinate distortion if the nut 60 is overtightened on the bolt.

Considering the structure as thus far described, reference is made to the various tabs or tongues as extending radially outward of the clamp 12. Actually this is not technically correct since the tongue 34 and the planar portion 40 lie in a plane which is spaced from the center of the clamp 12. The center of the clamp 12 is also the axis of the pipes 14 and 16 and hence the clamp and joint are coaxial as conventional. The tongue 54 and planar portion 44 also lie in substantially the same plane spaced from the center of the clamp 12. These tongues and planar portions will be referred to as substantially radially extending in order to avoid complex technical description of the actual construction. The spacing between the tongues 34 and 54 must be such as to allow for some movement toward one another during the taking up of the nut so that the clamp 12 may be compressed upon the joint 10. The bight 38 is fairly open with the planar portions 40 and 44 spaced well apart so that the clamp 12 may be readily assembled upon the joint. The bolt 36 should be long enough so that the halves of the clamp may be moved apart sufficient to enable them to be placed on the joint after which the tongue 52 is swung into position in the bight as shown. As soon as the inner grooves of the medial sections 32 and 50 commence to engage with the beads 18 and 20, the tongue 52 will be laterally restrained from moving out of the bight 38. As the nut 60 is screwed onto the bolt 36 bringing the tongues 34 and 54 together, the tongue 44 acts as a hinge and the two halves of the clamp 12 come together applying the wedging force previously described axially forcing the two flanges 22 and 24 together in a tight contact juncture 26.

Since the clamp 12 is intended for heavy duty, the metal from which the same is fabricated is of relatively heavy gauge. The bight 38 will normally not distort in applying the clamp 12 to the joint 10. The illustrated clamp and joint uses 2 inch outer diameter pipe and the dimensions may be proportionally scaled from this consideration. The clamp 12 was made out of ⅛ inch cold rolled steel sheet, suitably formed in a stamping press.

It will be seen that the several problems of achieving an emission free clamped joint have been solved and likewise problems concerned with manufacture and installation have also been solved. The clamp 12 is simple, easy to fabricate, and, although made out of two pieces, the pieces are not physically attached to one another. The hinging connection which is achieved is made without the need for any pins, bolts, or complex formations. It is held in assembly by reason of the self-centering action of the clamp cross sectional configuration coacting with the beads 18 and 20. It achieves a tight connection between the two pipes 14 and 16 by means of substantial axial force applied in a mechanically advantageous manner using constricting force. Due to the hinging action of the halves of the clamp there is no progressive diminution of radial force around the circumference of the clamp which is a fault with prior art single bolt clamps.

The joint 10 which has been described is satisfactory for the most part, but considering the problem of mass assembly along a fast-moving line, a worker required to hold the two pipes 14 and 16 end to end may have some difficulty in being required also to assemble the clamp halves thereon. Accordingly jigs or fixtures might have to be provided for this purpose. Such jigs and fixtures are eliminated by the joints 70 and 90 of FIGS. 5 and 6. Indeed such joints are preferred over the joint 10, although slightly more material is required in said joints 70 and 90.

The joints 70 and 90 are characterized by the provision of a pilot end on one of the pipes fitting into the other pipe to hold the joint in temporary assembly while the clamp is being installed. In each case the same kind of clamp is used. In the joint 70, there is a pipe 72 with bead 74 on its end exactly as in the case of the pipes 14 and 16. The second pipe 76 has the bead 78 formed at a location spaced from the free end of the pipe giving rise to a length 80 that extends beyond the bead 78, to the left as viewed in FIG. 5. In this case, the length 80 telescopes within the pipe 72 and for that purpose has an exterior diameter which is sufficient to enable this telescoping action. The length 80 would be necked during formation of the bead 78 to the smaller diameter probably in the same die forming the bead 78. Each of the beads 74 and 78 will have an axially facing flange-like portion 82 and 84 respectively which abut to provide the juncture 86. The added surface engagement of the joint 70 provides additional insurance against leaking of emission.

The joint 90 differs from the joint 70 only in that the pipe 92 and the pipe 94 are not of the same size. The pipe 94 is chosen to have an external diameter equal to the inner diameter of the pipe 92 so that they will telescope within one another. The bead 96 is formed on the end of the pipe 92 as before and the bead 98 is formed on the pipe 94 spaced from the free end of the pipe to provide the length 100 between the bead 98 and such free end. In this joint 90, therefore, there is no need for necking the pilot portion 100 of the pipe 94. In all other respects the joint 90 and its clamp 12 are the same as in the case of the joint 70 and its clamp 12.

To provide a longer lasting pipe system, the pipes thereof can be made of highly corrosive resistant metal, such as stainless steel. However, stainless steel is very tough. Consequently, it is often difficult to roll the ends of stainless steel pipe to a desired shape and the rolled bead ends of individual pipes are not always uniform. As a result, smooth fitting and tight pipe joints are not always obtained when the joint and clamp of the present invention are used in systems employing pipes of tough metal. To overcome this problem of mismatched (non-uniform) rolled ends of pipes made of a tough metal, a gasket may be employed, such as the gasket 106 shown in FIGS. 7 and 8.

Figure 7:
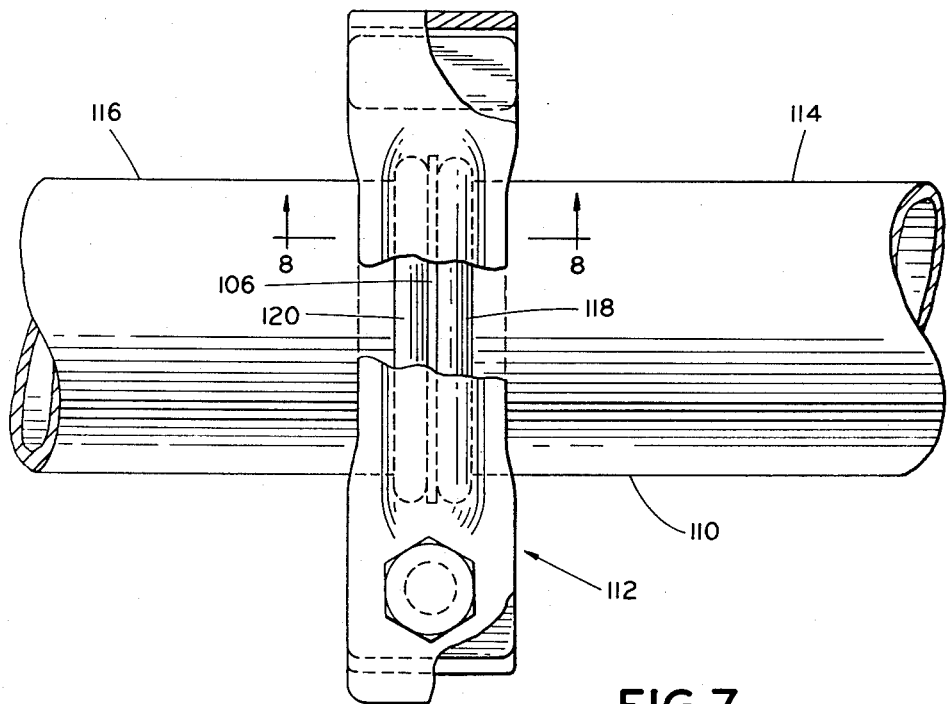
FIG. 7 is a top plan view, shown with portions broken away, of a modified pipe joint having a gasket interposed between pipe ends being joined.
Figure 8:
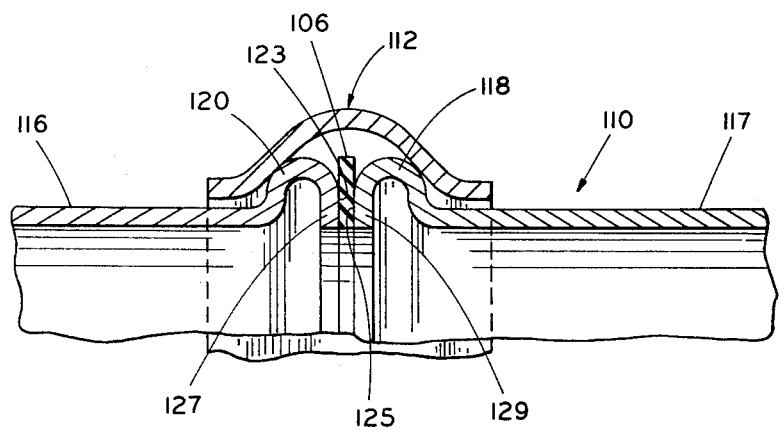
FIG. 8 is a fragmentary sectional view similar to FIG. 4, taken along the line 8—8 of FIG. 7 and in the direction indicated.

As shown in FIGS. 7 and 8, a pipe joint 110 similar to pipe joint 10 includes a clamp 112 which secures a pair of pipes 114 and 116 together. Specifically, the pipes 114 and 116 are formed with rolled ends forming ring-like bead formations (beads) 118 and 120 on such ends in accordance with the teachings of the invention. The gasket 106 is interposed between axially facing surfaces 123 and 125 on annular flanges 127 and 129 formed by the beads 118 and 120 and ensures a tight, emission-free clamped joint 110 in case the surfaces 123 and 125 are not smooth and uniform. In other respects, the joint 110 is substantially the same as the joint 10 shown in FIGS. 1–4.

From the foregoing description it will be apparent that obvious modifications may be made to the clamp and joint of the invention without departing from the spirit or scope of the invention as defined in the appended claims.

What is desired to be secured by Letters Patent of the United States is:

1. A clamped joint for use in internal combustion engine exhaust systems which comprises:
   A. a joint formed of a pair of pipes, each pipe having a bead formation at an end thereof, the bead formations including respective axially facing flange surfaces and the flange surfaces being substantially abutted face to face,
   B. a pipe clamp engaged over the bead formations and constricted thereon, the clamp having radially inwardly facing groove means along its inner surface with opposite surfaces of the groove means engaging the bead formations and applying wedging forces on said bead means causing the flange surfaces to be forced axially together,
   C. the clamp being formed of two generally semi-circular halves, each half having a substantially radially outwardly extending tongue on one end thereof with the tongues spaced apart and having cooperating fastening means for bringing the tongues together in securing the clamp to the joint, each half having a medial section provided with said groove means, and the second end of each half having cooperating formations providing a separable hinge connection thereat,
   D. said cooperating formations comprising an open bight on one of said second ends and a tab on the other of said second ends, the tab lying in the bight engaged against one side of said bight in surface engagement only,
   E. said bight being generally rectangular in configuration and having a pair of planar portions spaced apart, one planar portion extending substantially radially outwardly of the clamp and the other being parallel thereto, a bridge connecting the planar portions, said other planar portion having a free end, the said tab extending substantially radially outwardly of the clamp and being disposed in facing engagement with the inside of said other planar portion,
   F. said tongues having aligned perforations and said fastening means comprising a bolt extending through said perforations generally tangential to said clamp, one of said tongues having a right angle bent flange adapted to limit movement of the tongues toward one another.

2. A clamped joint for use in internal combustion engine exhaust systems which comprises:
   A. a joint formed of a pair of pipes, each pipe having a bead formation at an end thereof, the bead formations including respective axially facing flange surfaces and the flange surfaces being substantially abutted face to face,
   B. a pipe clamp engaged over the bead formations and constricted thereon, the clamp having radially inwardly facing groove means along its inner surface with opposite surfaces of the groove means engaging the bead formations and applying wedging forces on said bead means causing the flange surfaces to be forced axially together,
   C. one pipe of said joint having its bead formation spaced from the free end of said one pipe whereby to form a pilot extension, said pilot extension being telescoped within the other pipe to bring the bead formations together,
   D. the clamp being formed of two generally semi-circular halves, each half having a substantially radially outwardly extending tongue on one end thereof with the tongues spaced apart and having cooperating fastening means for bringing the tongues together in securing the clamp to the joint, each half having a medial section provided with said groove means, and the second end of each half having cooperating formations providing a separable hinge connection thereat,
   E. said cooperating formations comprising an open bight on one of said second ends and a tab on the other of said second ends, the tab lying in the bight engaged against one side of said bight in surface engagement only,
   F. said bight being generally rectangular in configuration and having a pair of planar portions spaced apart, one planar portion extending substantially radially outwardly of the clamp and the other being parallel thereto, a bridge connecting the planar portions, said other planar portion having a free end, the said tab extending substantially radially outwardly of the clamp and being disposed in facing engagement with the inside of said other planar portion,
   G. said tongues having aligned perforations and said fastening means comprising a bolt extending through said performations generally tangential to said clamp, one of said tongues having a right angle bent flange adapted to limit movement of the tongues toward one another.

3. A clamp for a pipe joint of the type which has a pair of side by side beads adapted to be forced against one another axially, said clamp comprising:
   A. a pair of independent generally semi-circular halves,
   B. each half having a first end and a second end and a medial section between the ends, the medial section having a generally arcuate cross-section to form inner groove means adapted to be engaged upon the side by side beads,
   C. a generally radially extending tongue on each first end, the tongues being spaced apart and having cooperating fastening means associated therewith to bring the tongues together in constricting the clamp,
   D. the second ends having cooperating formations providing a separable hinge joint thereat,
   E. said cooperating formations comprising an open bight on one of said second ends and a tab on the other of said second ends, the tab lying in the bight engaged against one side of the bight in surface engagement only,
   F. said bight being generally rectangular in configuration and having a pair of planar portions spaced apart, one planar portion extending substantially radially outwardly of the clamp and the other being parallel thereto, a bridge connecting the planar portions, said other planar portion having a free end, the said tab extending substantially radially outwardly of the clamp and being disposed in facing engagement with the inside of the said other planar portion,
   G. one of said tongues having a right angle bent flange directed toward the other tongue and adapted to limit movement of the tongues toward one another.

4. The clamp as claimed in claim 3 in which said tongues have aligned perforations and said fastening means comprise a bolt extending through said perforations generally tangential to said clamp.

5. A clamped joint comprising:
   A. a pair of pipes, each pipe having a rolled end forming a beaded formation directly thereon at an end thereof, said beaded formation each including respective axially facing flange surfaces, said flange surfaces being substantially abutted in face-to-face contact, and
   B. a pipe clamp formed of two generally semi-circular bands each formed of a single piece and each having a semi-circular medial portion and two end poritions extending respectively outwardly from said medial portion, the medial portion of each band having an arcuate cross-section and radially outwardly facing groove means along its inner surface with opposite surfaces of said groove means engaging the beaded formation and forming wedge portions tangentially engaging only at one point the surface of the rolled ends forming said beaded formation to apply a wedging force thereto to force the flange surfaces axially together, and fastening means cooperating with said respective end portions of said two semi-circular bands to secure the two semi-circular bands in tight fitting engagement over said band formations.

6. The clamped joint as claimed in claim 5 in which one pipe of the joint has its bead formation spaced from the free end of said one pipe whereby to form a pilot extension, said pilot extension being telescoped within the other pipe to bring the bead formations together.

7. The clamped joint as claimed in claim 6 in which the pipes are of the same outer and inner diameters and the pilot extension is formed as a smaller diameter neck to enable its outer diameter to engage within the other pipe.

8. The clamped joint as claimed in claim 6 in which the pipe having the pilot extension is of an outer diameter substantially the same as the inner diameter of the other pipe.

9. The clamped joint as claimed in claim 5 in which each said semi-circular band has a substantially radially outwardly extending tongue on one end thereof with the tongues spaced apart and having cooperating fastening means for bringing the tongues together in securing the clamp to the joint, each semi-circular band having a medial section provide with said groove means, and the second end of each semi-circular band having cooperating formations providing a separable hinge connection thereat.

10. The clamped joint as claimed in claim 9 in which said cooperating formations comprise an open bight on one of said second ends and a tab on the other of said second ends, the tab lying in the bight engaged against one side of said bight in surface engagement only.

11. The clamped joint as claimed in claim 10 in which said bight is generally rectangular in configuration and has a pair of planar portions spaced apart, one planar portion extending substantially radially outwardly of the clamp and the other being parallel thereto, a bridge connecting the planar portions, said other planar portion having a free end, the said tab extending substantially radially outwardly of the clamp and being disposed in facing engagement with the inside of said other planar portion.

* * * * *